United States Patent [19]

Emmerling

[11] 4,317,439
[45] Mar. 2, 1982

[54] COOLING SYSTEM
[75] Inventor: Robert C. Emmerling, Manhattan Beach, Calif.
[73] Assignee: The Garrett Corporation, Los Angeles, Calif.
[21] Appl. No.: 209,630
[22] Filed: Nov. 24, 1980

Related U.S. Application Data

[62] Division of Ser. No. 69,437, Aug. 24, 1979, abandoned.

[51] Int. Cl.³ ............................................ F02B 29/04
[52] U.S. Cl. ..................................... 123/563; 60/599
[58] Field of Search ................ 60/599; 123/563, 41.31

[56] References Cited

U.S. PATENT DOCUMENTS

| | | | |
|---|---|---|---|
| 3,018,617 | 1/1962 | Kelgard | 60/599 |
| 3,134,371 | 5/1964 | Crooks | 123/563 |
| 3,229,456 | 1/1966 | Gratzmuller | 123/563 |
| 3,306,032 | 2/1967 | Chaffiotte | 60/599 |
| 3,397,684 | 8/1968 | Scherenberg | 60/599 X |
| 3,439,657 | 4/1969 | Gratzmuller | 60/599 X |
| 3,442,258 | 5/1969 | Ruger et al. | 123/563 |
| 3,483,854 | 12/1969 | Foran et al. | 123/41.31 X |
| 3,872,835 | 3/1975 | Deutschmann | 123/563 |
| 4,061,187 | 12/1977 | Rajasekaran et al. | 123/41.31 X |
| 4,236,492 | 12/1980 | Tholen | 123/563 |

FOREIGN PATENT DOCUMENTS

| | | | |
|---|---|---|---|
| 1223196 | 8/1966 | Fed. Rep. of Germany | 60/599 |
| 2335248 | 1/1975 | Fed. Rep. of Germany | 60/599 |
| 45-36531 | 8/1970 | Japan | 60/599 |

*Primary Examiner*—Michael Koczo, Jr.
*Attorney, Agent, or Firm*—Albert J. Miller; Stuart O. Lowry

[57] ABSTRACT

A cooling system for a charge air combustion engine comprising series-mounted heat exchangers for two stage cooling of charge air supplied to the engine. A first stage charge air cooler heat exchanger is coupled into an engine-radiator liquid cooling system in series with the radiator and in parallel with the engine for passage of a portion of the liquid coolant at a first temperature level for first stage cooling of the charge air. A second charge air cooler heat exchanger is supplied with liquid coolant at a second, relatively lower temperature level for second stage cooling of the charge air.

12 Claims, 4 Drawing Figures

COOLING SYSTEM

This is a division of application Ser. No. 69,437 filed Aug. 24, 1979, now abandoned.

BACKGROUND OF THE INVENTION

This invention relates to engine cooling systems. More specifically, this invention relates to an improved charge air cooling system including a pair of back-to-back heat exchangers for two stage cooling of engine charge air.

A wide variety of cooling systems are known in the prior art for cooling charge air supplied to combustion engines. Typically, these cooling systems relate to one or more heat exchanger devices connected between a charge air compressor and an engine air intake manifold, such as in a turbocharged or supercharged internal combustion engine. The heat exchanger device is provided for cooling the charge air prior to supply thereof to the engine intake manifold in order to reduce the volume and to increase the density of the charge air supplied to the engine, and thereby improve engine performance and efficiency. Moreover, the heat exchanger device cools the charge air to lower overall engine heat load, and thereby reduce thermal loading to improve engine durability.

In the prior art, ambient air has been proposed for use as the cooling medium in a charge air heat exchanger. Use of ambient air is advantageous in that it comprises a readily available heat sink, and frequently comprises the lowest temperature coolant readily available in an engine environment, particularly in a motor vehicle application. See, for example, U.S. Pat. Nos. 4,059,080 and 4,062,188. However, to provide the desired degree of cooling, charge air heat exchangers using ambient air as the cooling medium have comprised relatively large heat exchangers which are not well suited for use in vehicle applications. Accordingly, with vehicles, charge air coolers using ambient air either have not been used because of their excessive size, or have been undersized so as not to provide the desired degree of cooling.

A more common prior art charge air cooling system comprises an air-to-liquid heat exchanger coupled into a liquid cooling circuit, wherein a liquid coolant is circulated through the heat exchanger in heat transfer relation with the charge air. See, for example, U.S. Pat. Nos. 3,229,456 and 4,061,187. Air-to-liquid heat exchangers are advantageous in that they provide a relatively small unit package with substantially improved cooling capacity compared with air-to-air devices, and thereby are more readily adapted for use on vehicles. However, for maximum space savings, an air-to-liquid charge air heat exchanger frequently is coupled into the engine cooling system so as to provide a single liquid flow system for cooling both the engine and the charge air. In these systems, the cooling liquid supplied to the charge air heat exchanger has a relatively high temperature level by virtue of its primary function of maintaining engine operating temperature within prescribed limits. Because of this high operating temperature level, the cooling liquid therefore generally is unable to provide the desired degree of cooling of the charge air. For examples of air-to-liquid charge air cooling systems coupled into the engine cooling system, see U.S. Pat. Nos. 3,397,684; 3,442,258; 3,863,612; and 3,872,835; British Pat. No. 920,020; German Pat. Nos. 1,140,018 and 1,223,196; and German Pub. No. 2,335,248.

Some prior art charge air cooling systems have attempted to provide improved charge air cooling by including multiple air-to-liquid heat exchangers with separate, independent cooling flow circuits for supplying liquid cooling to each heat exchanger. See, for example, U.S. Pat. Nos. 3,232,044 and 3,450,109. While such systems provide improved cooling of charge air, they also require substantial additional coolant flow circuitry and heat exchangers whereby these systems have generally not been commercially adapted for use in vehicle applications. Other prior art systems have attempted to provide improved cooling of charge air by including multiple air-to-liquid heat exchangers wherein one or more heat exchangers are coupled into the engine cooling system in series with the engine. Such systems are shown by way of example in U.S. Pat. Nos. 3,134,371 and 3,439,657; and in German Pub. No. 2,655,017, and are disadvantageous in that their cooling efficiency is highly dependent upon the amount of cooling required by the engine.

Still other multiple heat exchanger systems in the prior art comprise mechanical refrigeration systems such as those shown in U.S. Pat. Nos. 3,141,293 and 3,306,032. In these refrigeration systems, the compressed charge air is circulated through at least one evaporator or the like of a refrigeration system to provide substantially improved cooling of the compressed charge air. However, refrigeration schemes are not desirable in that substantial energy is required to operate the mechanical cooling system. In the case of vehicular engines, mechanical refrigeration systems comprise a substantial and undesirable load on an engine which detrimentally affects engine performance.

The present invention overcomes the problems and disadvantages of the prior art by providing an improved charge air cooling system including in series a pair of air-to-liquid heat exchangers for providing first and second stage cooling of the charge air prior to supply to the engine. The two stages are provided with progressively cooler liquid coolant for providing efficient, maximum cooling of the charge air prior for supply thereof to the engine.

SUMMARY OF THE INVENTION

In accordance with the invention, the cooling system comprises a pair of air-to-liquid charge air heat exchangers arranged in series for cooling charge air supplied to a vehicular engine. Compressed or heated charge air, such as that supplied from the compressor of a turbocharger or a mechanically driven supercharger, is received by a first air-to-liquid heat exchanger for first stage cooling thereof. The partially cooled charge air is supplied to a second air-to-liquid heat exchanger for second stage cooling to a relatively low temperature level. Upon exiting the second charge air heat exchanger, the cooled charge air is supplied directly to the intake manifold of the engine.

The first and second charge air heat exchangers are supplied with progressively cooler liquid coolant for maximum and efficient cooling of the charge air. The first charge air heat exchanger is connected into the engine cooling system, and is coupled in parallel with the engine and in series with an engine radiator for receiving liquid engine system coolant from the discharge side of the radiator. Charge air passing through the first charge air heat exchanger is then supplied to the second charge air heat exchanger which receives relatively cooler liquid coolant discharged from a cooling heat exchanger. In one embodiment, the cooling heat exchanger is mounted in a coolant loop independent of the engine cooling system, whereas in a second embodiment the cooling heat exchanger is coupled into the engine cooling system in series with the radiator and in parallel with both the engine and the first charge air heat exchanger.

In another embodiment of the invention, the cooling heat exchanger is coupled into the engine cooling system in parallel with the engine, and in series with the radiator and the first and second charge air heat exchangers. In this embodiment, a portion of the liquid coolant discharged from the radiator is first cooled through the cooling heat exchanger to a relatively low temperature level, and is then circulated through the second charge air heat exchanger for cooling charge air passing therethrough. Cooling discharged from the second charge air heat exchanger is then circulated through the first charge air heat exchanger for initial cooling of the charge air, and is then returned to the radiator for recirculation.

BRIEF DESCRIPTION OF THE DRAWINGS

The accompanying drawings illustrate the invention. In such drawings.

DETAILED DESCRIPTION OF THE PREFERRED EMBODIMENT

Figure 1:
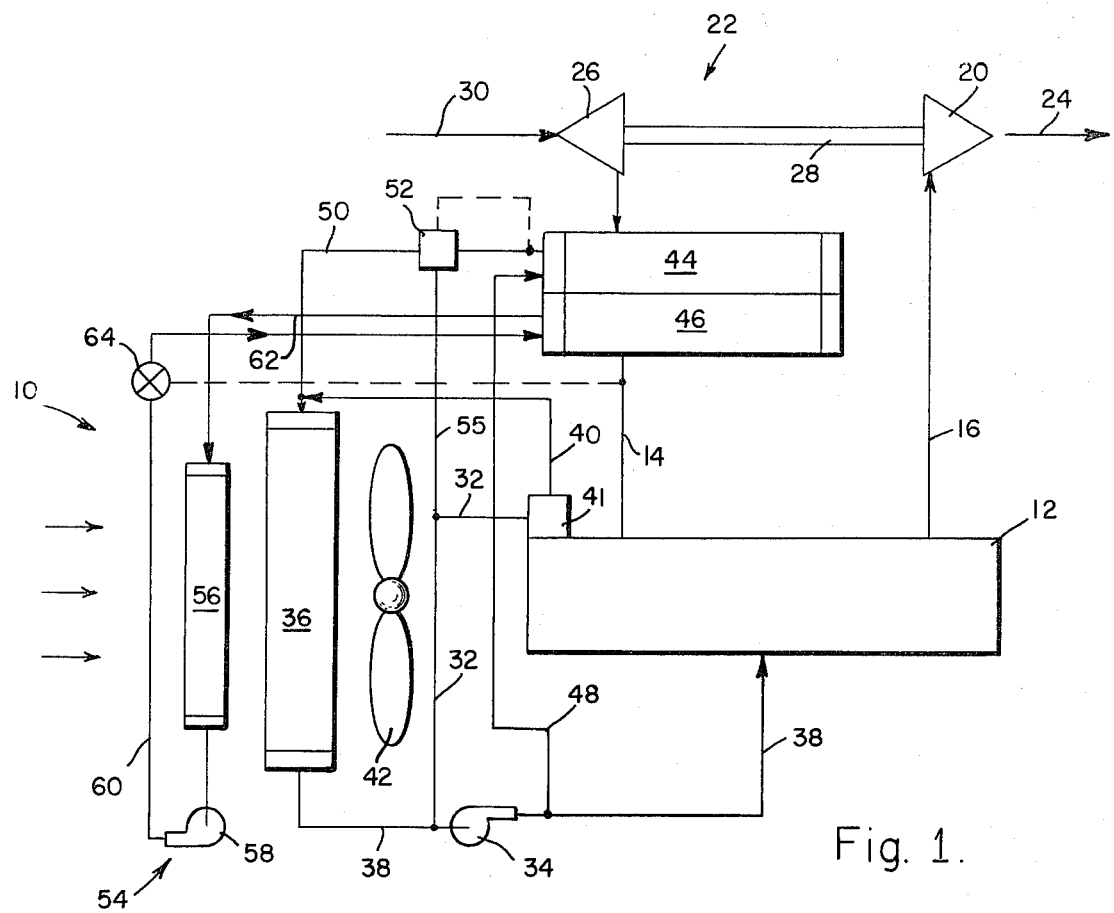
FIG. 1 is a schematic diagram illustrating a turbocharged engine system including a cooling system of this invention.

A turbocharged engine system 10 is illustrated schematically in FIG. 1, and comprises an engine 12 having an air intake 14 and an exhaust gas outlet 16. Exhaust gases from the engine 12 exit via the exhaust gas outlet 16 and are supplied to a turbine 20 of a turbocharger 22. The exhaust gases rotatably drive the turbine 20 before exiting to atmosphere via an exhaust conduit 24. The rotating turbine 20 correspondingly rotates a compressor impeller 26 mounted on a shaft 28 common to the turbine 20. The rotating compressor impeller 26 draws in ambient air via an intake 30, and compresses the air for supply to the engine 12 via the engine air intake 14. Alternately, the compressed air may be supplied to the engine intake as by a mechanically driven supercharger, or by other suitable means.

During operation, the engine 12 drivingly operates a pump 34 which pumps liquid coolant, such as a mixture of chemicals and/or water, from a radiator 36 to the engine 12 as by a coolant 38. The coolant is circulated through the engine in a conventional manner to absorb heat generated by the engine, and returns to the radiator 36 as by a return conduit 40. The collected heat is dissipated to ambient air via the radiator 36 which may comprise any well-known and suitable construction. A cooling fan 42 may be provided for forcing ambient air through the radiator 36 to increase the cooling capacity thereof, and said fan 42 may be driven by a suitable power source such as hydraulic, pneumatic, electrical, or shaft power or the like. Temperature and flow control of the liquid cooling circulating through the conduits 38 and 40 may be obtained in a well-known manner by means of a thermostatic control valve 41 mounted along the conduit 40 and operable to bypass a portion of the coolant around the radiator 36 by means of a bypass conduit 32 coupled to the intake side of the circulation pump 34.

The charge air supplied from the compressor 26 to the engine 12 is passed through first and second charge air heat exchangers 44 and 46, respectively, which may be combined into a single heat exchanger unit having two heat exchanger stages or sections, if desired. These charge air heat exchangers 44 and 46 each comprise an air-to-liquid heat exchanger, and are arranged for series passage of the charge air prior to supply thereof to the engine 12. More specifically, the heated, compressed charge air is passed through the first heat exchanger 44 for first stage cooling thereof to a reduced temperature level. The partially cooled charge air is then passed through the second charge air heat exchanger 46 for second stage cooling of the charge air prior to supply to the engine 12. In this manner, the temperature of the charge air is substantially reduced in two stages to increase the density of the charge air supplied to the engine, and to reduce the thermal loading upon critical components of the engine. Importantly, the first and second charge air heat exchangers 44 and 46 are provided with progressively cooler liquid coolant for maximum and efficient charge air cooling as will be hereafter described.

As shown in FIG. 1, the first charge air heat exchanger 44 is coupled into the engine cooling system for receiving a portion of the liquid cooling circulated through the radiator 36. More specifically, a conduit 48 is coupled to the discharge side of the circulation pump 34, and supplies liquid coolant exiting the radiator 36 to the first charge air heat exchanger 44. Accordingly, the first heat exchanger 44 is coupled in series with the radiator 36 and in parallel with the engine 12 for receiving a portion of the pump efflux for passage in close heat exchange relation with the charge air. Heat from the charge air is absorbed by the liquid coolant within the heat exchanger 44, and the thus-warmed coolant is returned directly to the engine radiator 36 by means of a return conduit 50. For close temperature control, the conduit 50 may include a proportioning flow valve 52 responsive to the temperature of coolant passing through the conduit 50 to return a portion of the liquid coolant directly to the intake side of the circulation pump 34 via a conduit 55 connected to the radiator bypass conduit 32.

The charge air partially cooled by passage through the first charge air heat exchanger 44 is then supplied to the second charge air heat exchanger 46 for second stage cooling to a relatively lower temperature level. The charge air passes through the second heat exchanger 46 in heat exchange relation with a relatively cooler liquid coolant. More specifically, as shown in FIG. 1, the liquid coolant circulated to the second stage charge air heat exchanger 46 comprises a coolant within an independent circulation loop 54 including a cooling heat exchanger 56 and a separate and suitably driven circulation pump 58. In operation, the pump 58 draws coolant from the cooling heat exchanger 56 and pumps the coolant through the second heat exchanger 46 via supply and return conduits 60 and 62. In this manner, the liquid coolant circulated through the second heat exhcnager 46 is substantially lower in temperature level than the coolant circulated through the first heat exchanger 44 to provide substantial second stage cooling of the charge air. Desirably, a flow control valve 64 is provided in the conduit 60 for controlling flow therethrough in response to the temperature of charge air supplied to the engine.

Figure 2:
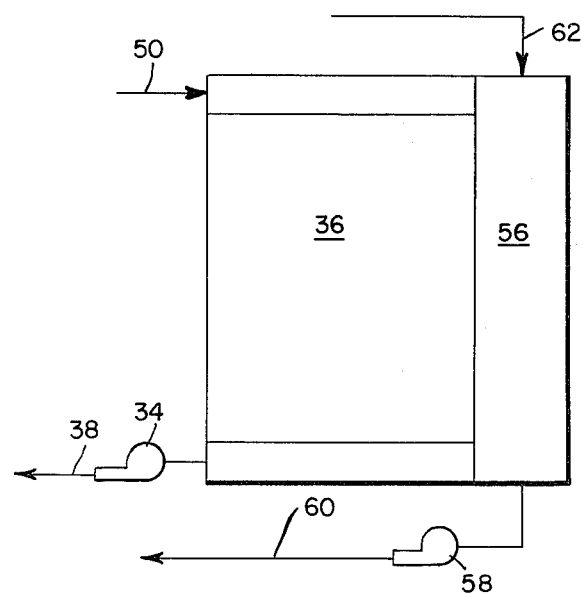
FIG. 2 is a schematic diagram illustrating one possible arrangement of heat exchangers for the system of FIG. 1.

The cooling heat exchanger 56 and the engine radiator 36 may be arranged back-to-back as illustrated in FIG. 1, whereby the fan 42 is operable to draw cooling ambient air through both heat exchangers 56 and 36 for cooling of the liquid coolants passing respectively therethrough. Alternately, as illustrated in FIG. 2, the heat exchangers 56 and 36 may be arranged side-by-side generally in a single packaged unit for easy and convenient mounting in a vehicle application. That is, as shown in FIG. 2, the radiator 36 and the low temperature heat exchanger 56 may be arranged side-by-side for parallel passage of ambient air for cooling of the respective liquid coolants circulated through these heat exchangers. In this manner, the fan 42 conveniently may be used to draw ambient air simultaneously across both heat exchangers 56 and 36 without having the dissipated heat load of either heat exchanger affect the efficiency or cooling capacity of the other heat exchanger.

Figure 3:
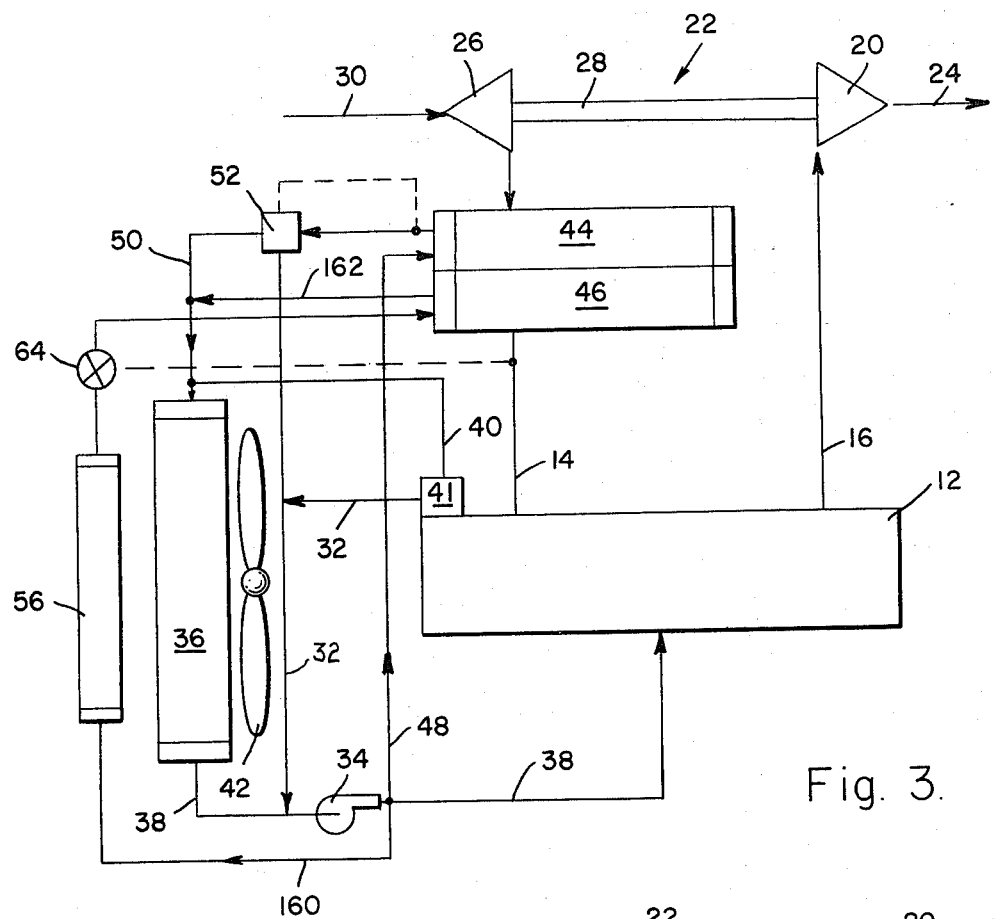
FIG. 3 is a schematic diagram illustrating a turbocharged engine system including an alternate embodiment of the invention.

An alternate arrangement of the invention is illustrated in FIG. 3, wherein components common to the system of FIG. 1 are identified by like reference numerals. In this arrangement, the second charge air heat exchanger 46 is provided with liquid coolant shared from the engine cooling system. That is, a portion of the liquid coolant efflux of the engine system circulation pump 34 is supplied to the cooling, heat exchanger 56 via a conduit 160. This coolant is circulated through the cooling heat exchanger 56 for substantial cooling thereof to a temperature level less than the temperature level of coolant supplied to the first charge air heat exchanger 44 via the conduit 48. The low temperature coolant is then supplied to the second charge air heat exchanger 46 for absorbing heat energy of the charge air. This liquid coolant exits the second heat exchanger 46 via a return conduit 162 which is coupled to the radiator intake as by connection to the return conduit 50 of the first charge air heat exchanger 44. With this construction, the cooling heat exchanger 56 and the second charge air heat exchanger 46 are integrated with the engine cooling system in series with the radiator 36 and in parallel with both the engine 12 and the first charge air heat exchanger 44. Importantly, as shown in the embodiment of the FIG. 1, the charge air is exposed to progressively cooler liquid coolant upon series passages through the first and second charge air heat exchangers 44 and 46 for maximum, efficient charge air cooling.

Figure 4:
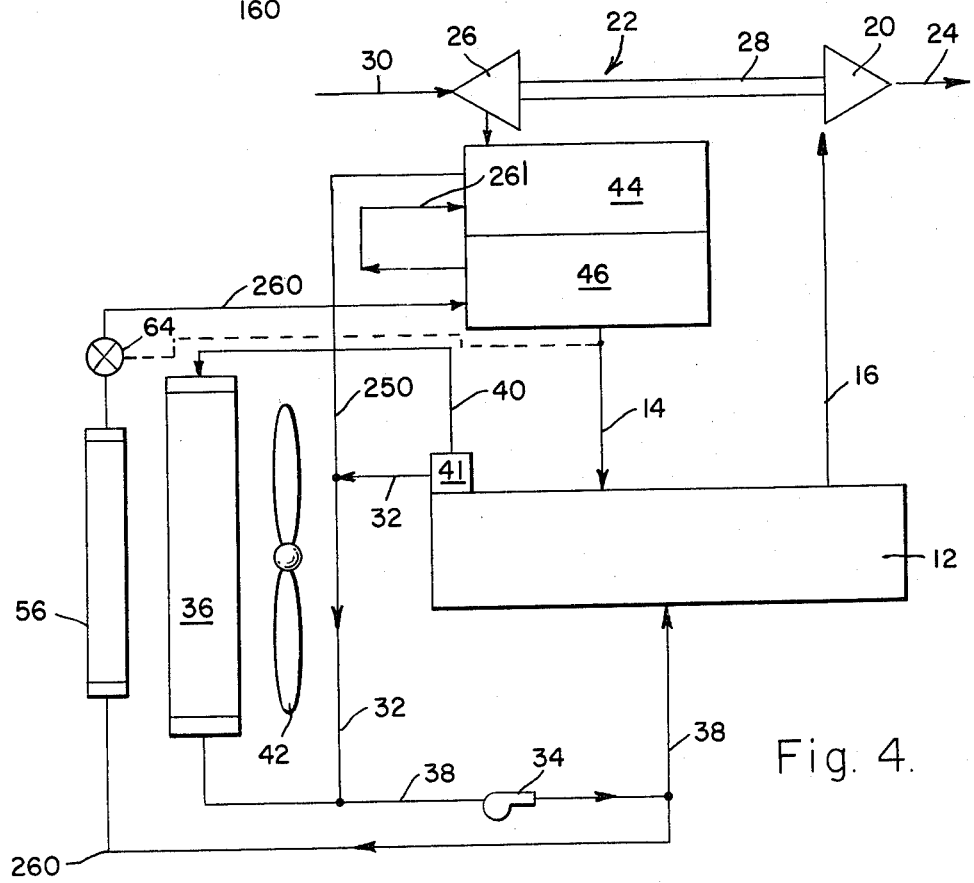
FIG. 4 is a schematic diagram illustrating a turbocharged engine system including another alternate embodiment of the invention.

Another embodiment of the invention is illustrated in FIG. 4, where components common to the embodiments of FIG. 1 and 3 are indicated by like reference numerals. In this system, the engine system circulation pump 34 provides liquid coolant for supply to the engine via the conduit 38, and for return to the radiator 36 via the return conduit 40. A portion of the liquid coolant discharged by the pump 34 is supplied to the cooling heat exchanger 56 via a conduit 260, whereby this portion of the coolant is substantially cooled to a relatively low level. The coolant exiting the cooling heat exchanger 56 is supplied via the conduit 260 to the second charge air heat exchanger 46 for substantial cooling of charge air passing therethrough. The thus partially-warmed liquid coolant is discharged from the second heat exchanger 46, and is supplied via a conduit 261 directly to the first charge air exchanger 44. This partially warmed coolant is passed in heat transfer relation with the charge air in the first heat exchanger 44, and is returned to the intake side of the circulation pump 34 via a return conduit 250. Alternately, if desired, the warmed coolant exiting the first heat exchanger 44 can be circulated back to the radiator 36 as in the embodiments of FIGS. 1 and 3.

In the embodiment of FIG. 4, the charge air passes through the first charge air heat exchanger 44 for first stage cooling by virtue of heat exchange communication with the partially-warmed coolant supplied to the first heat exchanger 44. The charge air is then cooled to a lower temperature level upon passage through the second charge air heat exchanger 46 in heat transfer relation with the relatively cooler coolant discharged from the cooling heat exchanger 56. Accordingly, once again, the charge air is substantially cooled by heat transfer communication with progressively cooler liquid coolant supplied to the first and second charge air heat exchangers 44 and 46. Moreover, the temperature of the charge air supplied to the engine may be suitably controlled by varying the flow of the liquid coolant to the heat exchangers 44 and 46 in response to the charge air temperature by means of a flow control valve 64 coupled into the conduit 162.

The cooling system set forth herein comprises an improved and relatively compact charge air cooling arrangement for use with combustion engines, and particularly for use in vehicle applications. While a wide variety of modifications and improvements relating to the systems described herein are believed to be possible, no limitation upon the invention is intended except as set forth in the appended claims.

What is claimed is:

1. A cooling system for a charge air combustion engine, comprising a radiator mounted in series with the engine for circulation of a liquid coolant through said radiator and the engine for controlling the operating temperature of the engine; first and second charge air heat exchanger means for serial passage of charge air supplied to the engine, said first heat exchanger means being mounted in series with said radiator and in parallel with the engine, said second heat exchanger means being mounted in series with said radiator and in parallel with both said first heat exchanger means and the engine; a cooling heat exchanger mounted in series with said second heat exchanger means and in parallel with said first heat exchanger means and the engine for reducing the temperature of liquid coolant circulated to said second heat exchanger means; and means for circulating a liquid coolant in parallel through the engine and through said first heat exchanger means for first stage cooling of the charge air and through said cooling heat exchanger and said second heat exchanger means for further and second stage cooling of the charge air.

2. A cooling system as set forth in claim 1 wherein said circulation means comprises pump means for the circulating liquid coolant.

3. A cooling system as set forth in claim 1 including means for controlling the flow of liquid coolant through said second heat exchanger means in response to the temperature level of charge air supplied from said second heat exchanger means to the engine.

4. A cooling system as set forth in claim 1 including means for controlling the flow of liquid coolant through said first heat exchanger means in response to the temperature level of liquid coolant passing from said first heat exchanger means.

5. A cooling system as set forth in claim 1 including fan means for circulating cooling air in heat exchange relation with liquid coolant passing through said cooling heat exchanger and said radiator.

6. A cooling system as set forth in claim 5 wherein said cooling heat exchanger and said radiator are arranged for series passage of the cooling air.

7. A cooling system for a charge air combustion engine, comprising a radiator coupled in series with the engine for circulation of liquid coolant through said radiator and the engine for controlling the operating temperature level of the engine; first charge air heat exchanger means for first stage passage of charge air supplied to the engine, said first heat exchanger means being coupled in series with the radiator and in parallel with the engine for circulation of liquid coolant at a first temperature level through said radiator and said first heat exchanger means for first stage cooling of the charge air; second charge air heat exchanger means for second stage passage of the charge air; a cooling heat exchanger coupled in series with said second heat exchanger means; and means for circulating the liquid cooling in parallel through the engine and through said first heat exchanger means and in series through said cooling heat exchanger and said second heat exchanger means whereby said second heat exchanger means receives the liquid coolant at a second, relatively lower temperature level for further and second stage cooling of the charge air.

8. A cooling system for a charge air combustion engine, comprising a radiator mounted in series with the engine for circulation of a liquid coolant through said radiator and the engine to control the operating temperature of the engine; first charge air heat exchanger means for first stage passage and cooling of charge air supplied to the engine, said first heat exchanger means being mounted in series with said radiator and in parallel with the engine for passage of a portion of the liquid at a first temperature level; second charge air heat exchanger means for second stage passage and further cooling of the charge air; a cooling heat exchanger mounted in series with said second heat exchanger means for passage of another portion of the liquid coolant through said cooling heat exchanger and then through said second heat exchanger means at a second, relatively lower temperature level, said cooling heat exchanger and said second heat exchanger means being mounted in series with said radiator and in parallel with both said first heat exchanger means and the engine; and means for circulating the liquid coolant from said radiator in parallel through the engine, through said first heat exchanger means, and through in series said cooling heat exchanger and said second heat exchanger means.

9. In a charge air combustion engine, a method of cooling charge air supplied to the engine, comprising the steps of providing a radiator coupled to the engine for circulation of a liquid coolant through the radiator and the engine for controlling the operating temperature of the engine; coupling first charge air heat exchanger means in series with the radiator and in parallel with the engine for circulation of liquid coolant from the radiator through the first heat exchanger means at a first temperature level; providing a cooling heat exchanger and second charge air heat exchanger means in series with each other and the radiator, and in parallel with both the first heat exchanger means and the engine, for circulation of liquid coolant from the cooling heat exchanger through the second heat exchanger means at a second relatively lower temperature level; and passing the charge air in series through the first and second heat exchanger means whereby the charge air is cooled to a first stage by passage through the first heat exchanger means and then further cooled to a second stage by passage through the second heat exchanger means.

10. The method of claim 9 including controlling the flow of liquid coolant through said first and second heat exchanger means for controlling the temperature of charge air supplied to the engine.

11. The method of claim 9 including circulating ambient air in heat exchange relation with liquid coolant passing through the radiator and the cooling heat exchanger.

12. In a charge air combustion engine, a method of cooling charge air supplied to the engine, comprising the steps of providing a radiator coupled to the engine for circulation of a liquid coolant through the radiator and the engine for controlling the operating temperature of the engine; coupling first charge air heat exchanger means in series with the radiator and in parallel with the engine for circulation of liquid coolant from the radiator through the first heat exchanger means at a first temperature level; providing a cooling heat exchanger and second charge air heat exchanger means in series with each other and the radiator, and in parallel with both the engine and the first heat exchanger means for circulation of liquid coolant from the cooling heat exchanger through the second heat exchanger means at a second relatively lower temperature level; circulating the liquid coolant from the radiator in parallel through the engine, through the first heat exchanger means, and in series through the cooling heat exchanger and the second heat exchanger means; and passing the charge air in series through the first and second heat exchanger means whereby the charge air is cooled to a first stage by passage through the first heat exchanger means and then further cooled to a second stage by passage through the second heat exchanger means.

* * * * *